(12) United States Patent
Tseng et al.

(10) Patent No.: US 9,479,051 B2
(45) Date of Patent: Oct. 25, 2016

(54) SINGLE-INDUCTOR MULTIPLE-OUTPUT DC TO DC CONVERTER

(75) Inventors: Chien-Chung Tseng, Zhubei (TW); Eric Soenen, Austin, TX (US); Alan Roth, Leander, TX (US); Justin Shi, Ann Arbor, MI (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 177 days.

(21) Appl. No.: 13/340,746

(22) Filed: Dec. 30, 2011

(65) Prior Publication Data
US 2013/0082668 A1 Apr. 4, 2013

Related U.S. Application Data

(60) Provisional application No. 61/541,643, filed on Sep. 30, 2011.

(51) Int. Cl.
G05F 1/577 (2006.01)
H02M 3/158 (2006.01)
H02M 1/00 (2006.01)

(52) U.S. Cl.
CPC ....... *H02M 3/158* (2013.01); *H02M 2001/009* (2013.01)

(58) Field of Classification Search
CPC .................. H02M 2001/009; H02M 3/158
USPC ...................... 323/266–268, 272; 307/31, 41
See application file for complete search history.

(56) References Cited

U.S. PATENT DOCUMENTS

| | | | |
|---|---|---|---|
| 7,312,538 B2 * | 12/2007 | May ................................ 307/31 |
| 7,432,614 B2 | 10/2008 | Ma et al. |
| 2004/0201281 A1 * | 10/2004 | Ma et al. ........................ 307/38 |
| 2012/0326691 A1 * | 12/2012 | Kuan et al. .................... 323/299 |

FOREIGN PATENT DOCUMENTS

TW        201034366        9/2010

OTHER PUBLICATIONS

Lee, Y.H. et al., "Interleaving Energy-Conservation Mode (IECM) Control in Single-Inductor Dual-Output (SIDO) Step-Down Converters with 91% Peak Efficiency", IEEE Journal of Solid-State Circuits, Apr. 2011, 46(4):904-915.
Ki, W.H. et al., "Single-Inductor Multiple-Output Switching Converters", 2001 IEEE 32nd Annual Power Electronics Specialists Conference, Jun. 2001,1:226-231.
Ma, D. et al., "A Pseudo-CCM/DCM SIMO Switching Converter with Freewheel Switching", 2002 IEEE International Solid-State Circuits Conference, Digest of Technical Papers, ISSCC 2002/ Session 23/Analog Techniques/23.6, 3 pages.
Ma, D. et al., "A Pseudo-CCM/DCM SIMO Switching Converter with Freewheel Switching", IEEE Journal of Solid-State Circuits, Jun. 2003, 38(6):1007-1014.

* cited by examiner

*Primary Examiner* — Jue Zhang
(74) *Attorney, Agent, or Firm* — Duane Morris LLP (57) ABSTRACT

A DC to DC converter includes a switching circuit and a controller. The switching circuit includes an inductor coupled to first and second voltage supply nodes and to a plurality of output loads. The controller is configured to monitor a current through the inductor and to selectively couple the inductor to each of the plurality of output loads such that at least one of the following criteria is met: 1) an average current through the inductor is minimized for the particular output loads coupled to the switching circuit, or 2) minimize a number of times the switching circuit is switched during a charging period for the particular output loads coupled to the switching circuit.

19 Claims, 7 Drawing Sheets

SINGLE-INDUCTOR MULTIPLE-OUTPUT DC TO DC CONVERTER

CROSS-REFERENCE TO RELATED APPLICATIONS

This application claims priority to U.S. provisional patent application No. 61/541,643, filed on Sep. 30, 2011, the entirety of which is herein incorporated by reference.

FIELD OF DISCLOSURE

The disclosed system and method relate to integrated circuit. More specifically, the disclosed system and method relate to single-inductor, multiple-output ("SIMO") DC-DC converter integrated circuits.

BACKGROUND

Direct current to direct current ("DC to DC") converters are important components in portable electronic devices such as music players, cellular telephones, and laptop and tablet computers. These complex portable devices include various different types of circuits that each may require a different voltage level. DC to DC converters are used to convert a first voltage level, which may be received from a battery of the portable electronic device, to a plurality of different voltage levels. One example of a frequently used DC to DC converter is a single-inductor, multiple-output ("SIMO") DC to DC converter. However, conventional SIMO DC to DC converters are either inefficient or have poor handling of load changes.

DETAILED DESCRIPTION

This description of the exemplary embodiments is intended to be read in connection with the accompanying drawings, which are to be considered part of the entire written description.

The disclosed single-inductor, multiple-output ("SIMO") direct current to direct current ("DC to DC") converters advantageously combine pulse-width modulation ("PWM") and pulse-frequency modulation ("PFM") controls to provide piggyback and/or folded-piggyback control methods that minimize the average current through an inductor and/or minimize the number of times the DC to DC converter is switched. Reducing the number of times the DC to DC converter switches provides for a higher power efficiency as switching losses are reduced.

Figure 1:
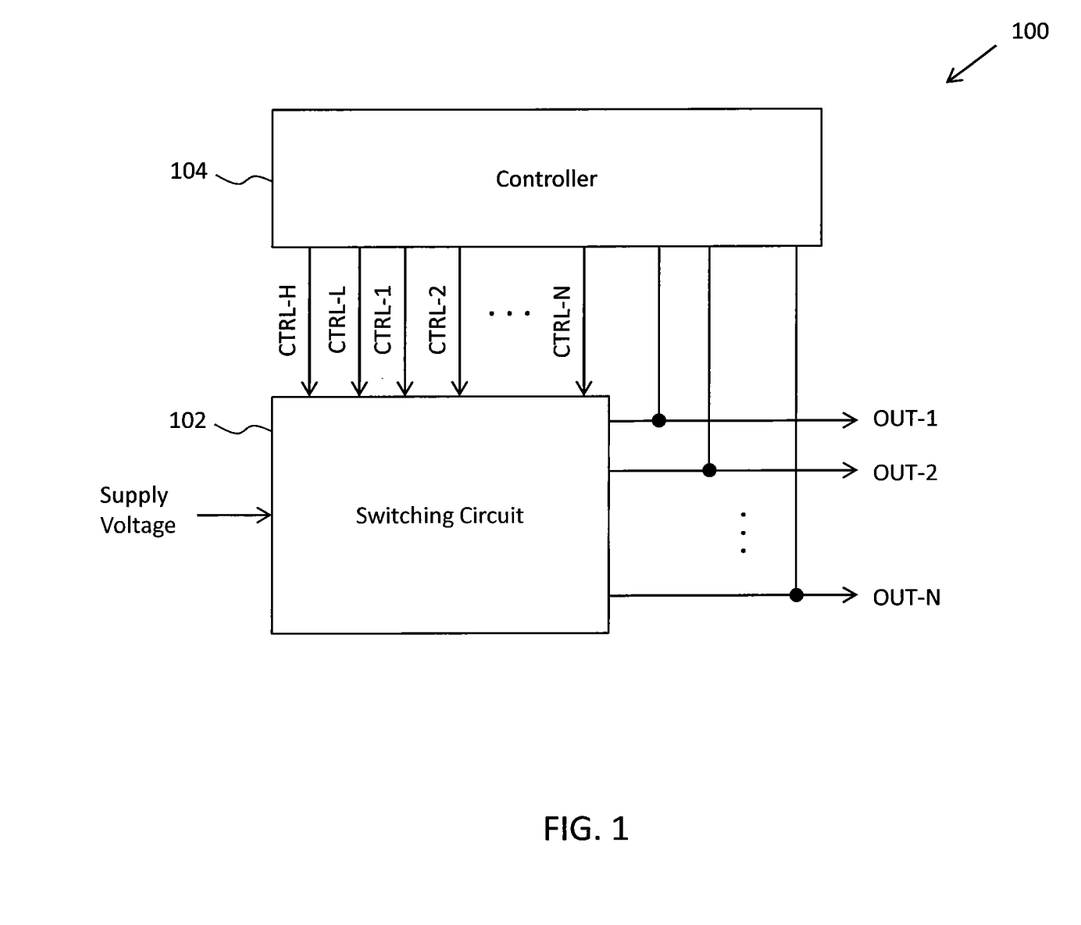
FIG. 1 is a block diagram of one example of an improved DC to DC converter.

FIG. 1 is a block diagram of an improved DC to DC converter 100. As shown in FIG. 1, converter 100 includes a switching circuit 102 configured to receive a supply voltage from a voltage source (not shown), which may be a battery or other voltage supply as will be understood by one skilled in the art. Switching circuit 102 received a number, e.g., n+2, of control signals, CTRL-H, CTRL-L, CTRL-1, . . . , CTRL-N, from a controller 104, which may be implemented as control logic, a state machine, or other circuit for asserting control signals to control switching circuit 102. In response to the control signals, switching circuit 102 outputs a number, n, of output voltages to other circuitry (not shown).

Figure 2:
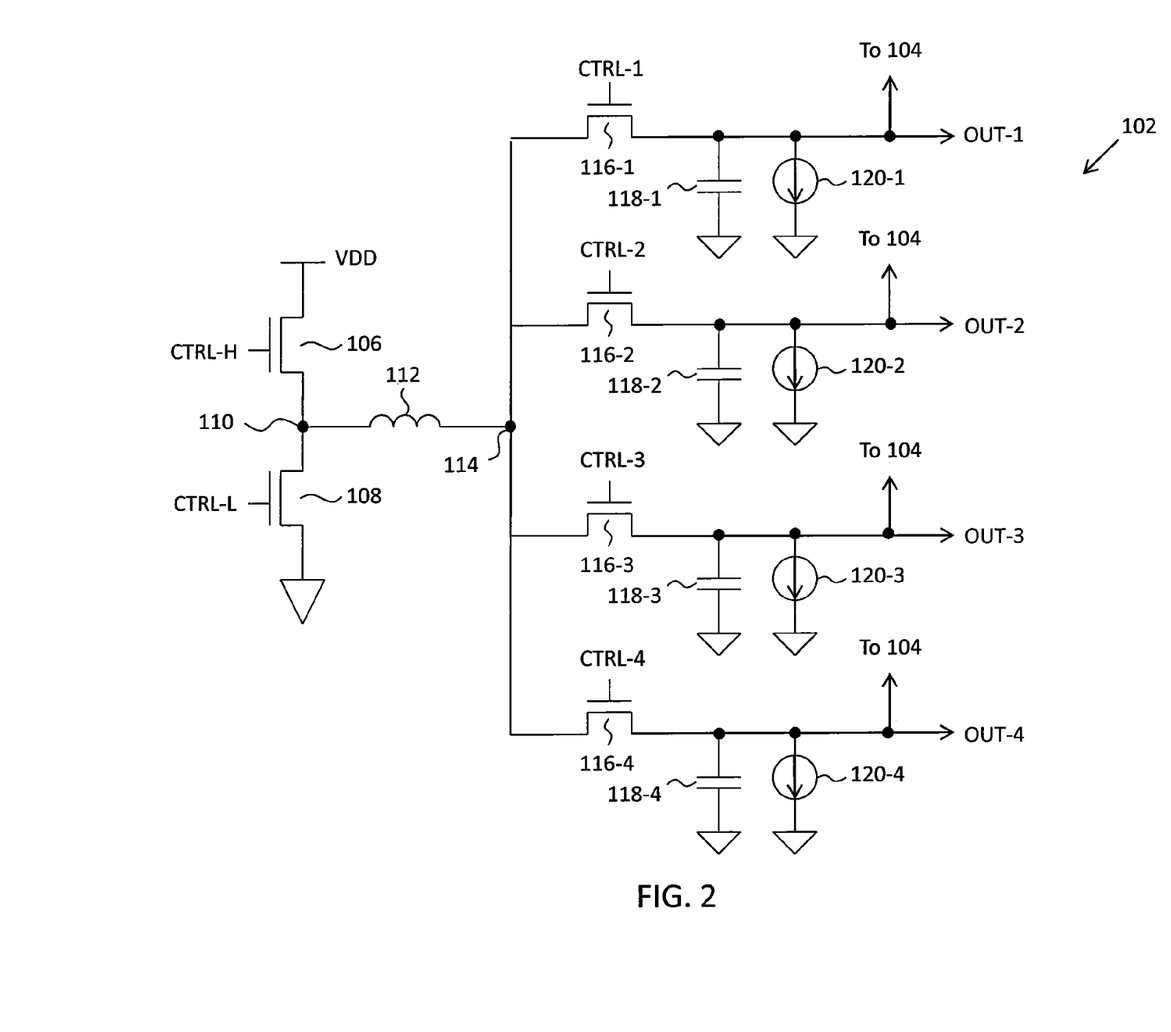
FIG. 2 illustrates one example of a switching circuit in accordance with the improved DC to DC converter illustrated in FIG. 1.

FIG. 2 illustrates one example of a switching circuit 102 in accordance with the DC to DC converter illustrated in FIG. 1. As shown in FIG. 2, switching circuit 102 may be a SIMO that includes a pair of transistors 106 and 108 disposed in serial between a first or high voltage supply line or node, which may be the operating voltage of the battery, e.g., VDD, and a second or low voltage supply line or node, which may be set at VSS or ground. Transistor 106 may be an NMOS transistor having its drain coupled to VDD and its source coupled to node 110 to which the source of NMOS transistor 108 is coupled. The gates of transistors 106 and 108 are coupled to respective control signals, CTRL-H and CTRL-L, that selectively turn on and off transistors 106 and 108.

For example, when CTRL-H is a logic high such that transistor 106 is in a current-conducting 'on' state, CTRL-L is a logic low such that transistor 108 is in a non-current conducting 'off' state. In some embodiments, control signals CTRL-H and CTRL-L are provided such that transistors 106 and 108 have fifty percent duty; however, one skilled in the art will understand that transistors 106 and 108 may have other duty cycles.

Node 110 is coupled to inductor 112, which is also coupled to node 114. Node 114 is coupled to a plurality of switches 116-1, 116-2, 116-3, 116-4 (collectively referred to as "switches 116"), which may be implemented as an NMOS transistors as illustrated, that are disposed in parallel with each other. Although four switches 116 are illustrated in FIG. 2, one skilled in the art will understand that fewer or more switches may be implemented. A respective capacitor 118-1, 118-2, 118-3, 118-4 ("capacitors 118") and current source 120-1, 120-2, 120-3, 120-4 ("current sources 120") are coupled to a respective output node OUT-1, OUT-2, OUT-3, OUT-4. For example, output node OUT-1 is coupled to switch 116-1 and to capacitor 118-1 and current source 120-1, which are disposed in parallel with each other between node OUT-1 and ground.

Each of the gates of switches 116 is configured to receive a respective control signal CTRL-1, CTRL-2, CTRL-3, CTRL-4 from controller 104. Controller 104 is configured to monitor the power being output at each of the output nodes and selectively turn on and off switches 116 to minimize the switching loss.

Figure 3:
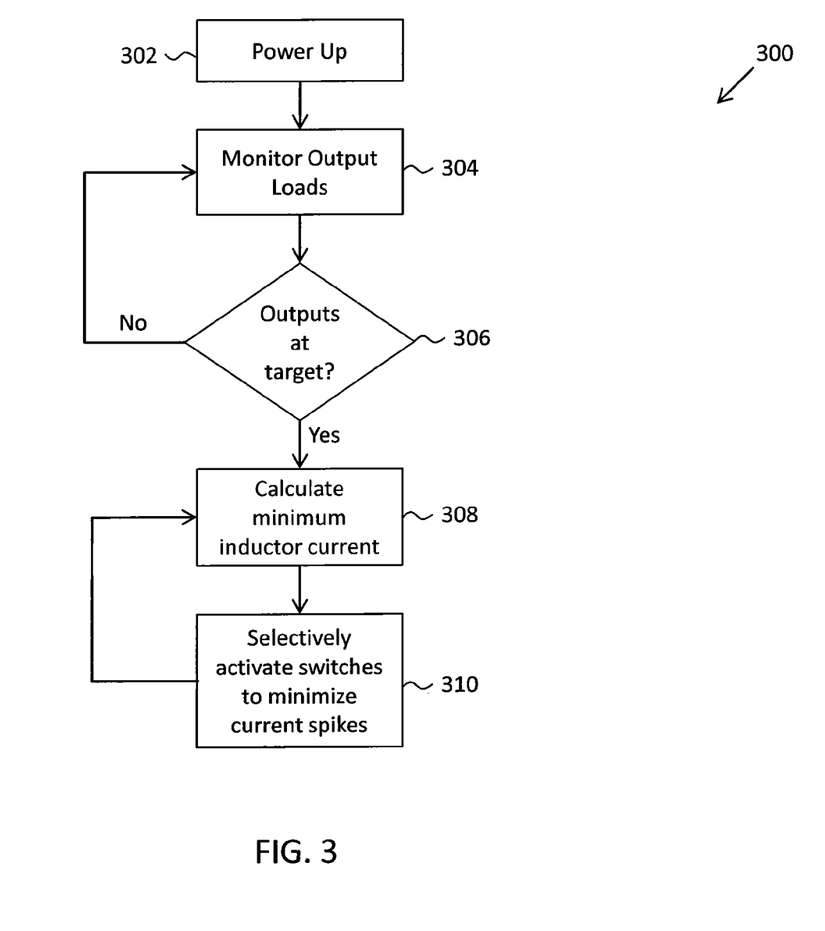
FIG. 3 is one example of a flow diagram that may be implemented by control logic and/or a state machine in accordance with the DC to DC converter illustrated in FIG. 1.

FIG. 3 is a flow diagram of one example of a process 300 implemented by controller 104. As will be understood by one skilled in the art, the process 300 implemented by controller may be implemented in hardware and/or software. If implemented in hardware, controller 104 may include various logic gates such as AND gates, NAND gates, OR gates, and NOR gates as well as other devices. In some embodiments, controller 104 is implemented as a state machine and includes a processor and a tangible machine readable storage medium, such as a read only memory ("ROM"), a random access memory ("RAM"), Flash memory, CD-ROMs, DVD-ROMs, Blu-ray disks, and hard drives, to name a few possibilities, that includes program code. When the program code is loaded into and executed by a machine, e.g., the processor, the machine becomes an apparatus for practicing the process.

As shown in FIG. 3, the controller 104 is powered up at block 302. At block 304, each of the outputs of switching circuit 102 is monitored by control/logic state machine 104. At decision block 306, a determination is made as to whether the outputs, OUT-1, OUT-2, OUT-3, OUT-4, of switching circuit 102 have reached an initial target level.

If the outputs of switching circuit 102 are not at their respective initial target levels, then process 300 continues to monitor the output loads at block 304 where it then returns to decision block 306. Once the outputs of switching circuit 102 reach their initial target levels, process 300 continues to block 308.

At block 308, the minimum current through inductor 112 is estimated. The estimated minimum current through inductor 112 is based on a combination of output loads. For example, an initial output load may be a fixed load such as 500 mA at output node OUT-1, a 300 mA load at output node OUT-2, a 50 mA load at output node OUT-3, and a 30 mA load at output node OUT-4.

Once the minimum current through inductor 112 is estimated, process 300 moves to block 310 where it actively controls switching circuit 102 to minimize current spikes (e.g., average current) through inductor 112 as explained with reference to FIGS. 4A-7. The monitoring processes of blocks 308 and 310 may be continuous. If, for example, controller 104 wakes up from asleep mode, then controller may automatically re-estimate the minimum inductor current and re-form the charging sequence of piggyback and/or folded piggyback control.

Figure 4A:
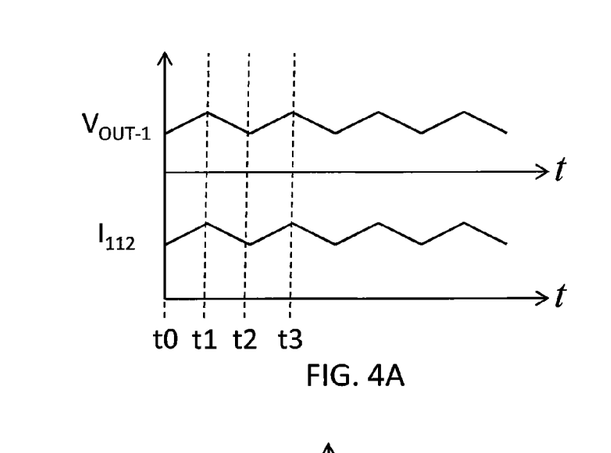
FIG. 4A is a current versus time graph of a PWM operating mode of a DC to DC converter in accordance with FIGS. 1 and 2.

Referring first to FIG. 4A, the output voltage and current through inductor 112 are illustrated when one of the outputs of DC to DC converter 100 operates in a PWM operating mode to drive a large load coupled to an output node, e.g., output node OUT-1. To produce the waveforms illustrated in FIG. 4A, transistors 106 and 108 are alternately turned on and off in response to control signals CTRL-H and CTRL-L to provide output node OUT-1 with energy to drive its respective load. In some embodiments, the turning on and off is of transistors 106 and 108 is done at a duty cycle that approaches and may reach 50 percent, although one skilled in the art will understand that other duty cycles may be used.

For example, transistor 106 is in a current-conducting 'on' state to couple supply voltage VDD to inductor 112 such that inductor 112 is charged up at time t0 as current flows from VDD to inductor 112. Also at time t0, transistor 108 is in a current-conducting 'off' state to disconnect inductor 112 from low voltage power supply. Switch 116-1 is closed to couple output node OUT-1 to VDD and to inductor 112 such that current flows from VDD to the load coupled to output node OUT-1.

At time t1, transistor 106 is turned off and transistor 108 is turned on. With transistor 106 off, inductor 112 is disconnected from the high voltage power supply. Transistor 108 being on coupled inductor 112 to the low voltage power supply such that inductor 112 discharges its energy as current continues to flow from inductor 112 to the load coupled to output node OUT-1. Accordingly, the directional flow of current through inductor 112 is maintained as current continues to flow from left to right in FIG. 2.

At time t2, transistor 106 is turned on and transistor 108 is turned off. The time at which transistor 106 is turned on and transistor 108 is turned off is selected to maintain the directional flow of current through inductor 112 and to avoid the current through inductor 112 reversing direction and flowing to ground. As described above, inductor 112 is charged when transistor 106 couples inductor 112 to the high voltage power supply and transistor 108 disconnects inductor 112 from the low voltage power supply as current flows from VDD to inductor 112. The voltage at output node OUT-1, $V_{OUT-1}$, and current through inductor 112, $I_{112}$, both increase until time t3 at which point transistor 106 is turned off and transistor 108 is turned on. In this manner DC to DC converter 100 drives a large load coupled to output node OUT-1.

Figure 4B:
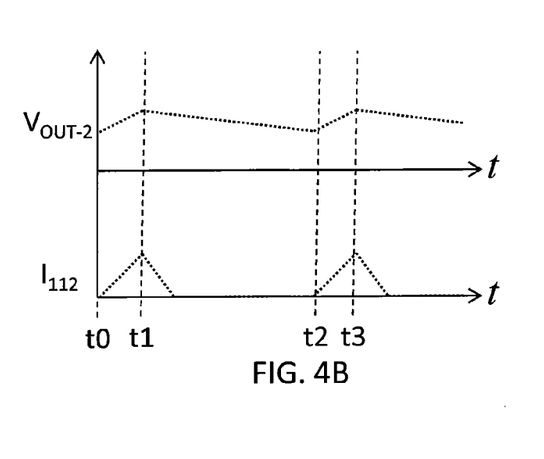
FIG. 4B is a current versus time graph of a PFM operating mode of a DC to DC converter in accordance with FIGS. 1 and 2.

FIG. 4B illustrates the output voltage, $V_{OUT-2}$, and inductor 112 current, $I_{112}$, waveforms when one of the outputs of DC to DC converter 100 operates in a PFM operating mode to drive a smaller load than the load coupled to output node OUT-1, e.g., output node OUT-2. Between times t0 and t1 transistor 106 is on and transistor 108 is off such that inductor 112 is charged by the high voltage power supply.

At time t1, transistor 106 is turned off and transistor 108 is turned on to couple inductor 112 to the low voltage power supply. Switch 116-2 is closed to couple output node OUT-2 to inductor 112. Due to the smaller load being coupled to output node OUT-2, the voltage of output node OUT-2, $V_{OUT-2}$, decreases at a slow rate as seen by comparing the slope of $V_{OUT-2}$ in FIG. 4B between times t1 and t2 to the slope of $V_{OUT-1}$ in FIG. 4A between times t1 and t2. The direction of current through inductor 112, $I_{112}$, is maintained even as $I_{112}$ approaches zero.

At time t2, transistor 106 is turned on to couple inductor 112 to the high voltage power supply, and transistor 108 is turned off to disconnect inductor 112 from the low voltage power supply. Once inductor 112 is charged, transistor 106 is turned off to disconnect inductor 112 from the high voltage power supply and transistor 108 is turned on at time t3.

Figure 4C:
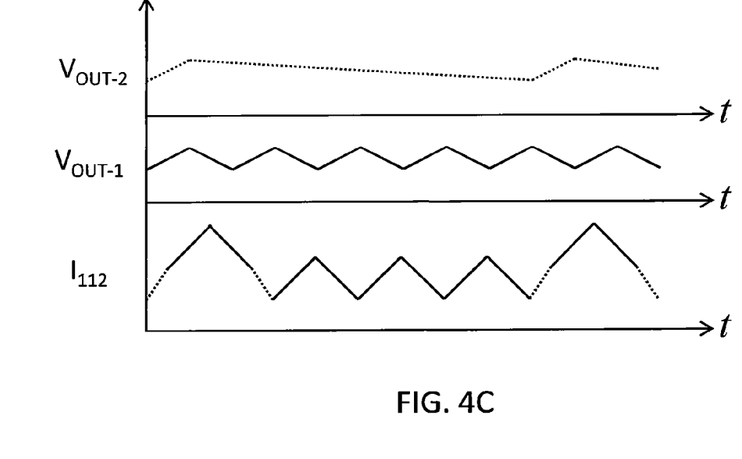
FIG. 4C is a current versus time graph of a combined PWM and PFM operating mode of a DC to DC converter in accordance with FIGS. 1 and 2.

FIG. 4C illustrates a piggyback operating method of a SIMO DC to DC converter 100 in which light loads may be skipped during a charging cycle when the capacitor coupled to the load has sufficient stored energy to drive the load to which it is coupled. Put another way, an output node coupled to a particular load may be skipped in one or more charging cycles, i.e., not be coupled to the inductor 112 through its respective transistor 116, if the capacitor 118 has sufficient stored energy to serve the load to thereby reduce the number of times transistors 116 are switched.

The piggyback method illustrated in FIG. 4C shows the superposition of the current through inductor 112 and the corresponding output voltages at nodes OUT-1 and OUT-2. The superposition may be implemented by opening and closing switches 116-1 and 116-2 to selectively couple output nodes OUT-1 and OUT-2 to inductor 112 while at the same time selectively turning on and off transistors 106 and 108 to selectively couple inductor 112 to the high and low power supplies.

Minimizing or reducing the number of times the transistors are switched, which reduces loss due to switching, i.e., reduces switching loss. The reduction in switching losses leads to an improved power efficiency of the SIMO DC to DC converter.

Figure 5A:
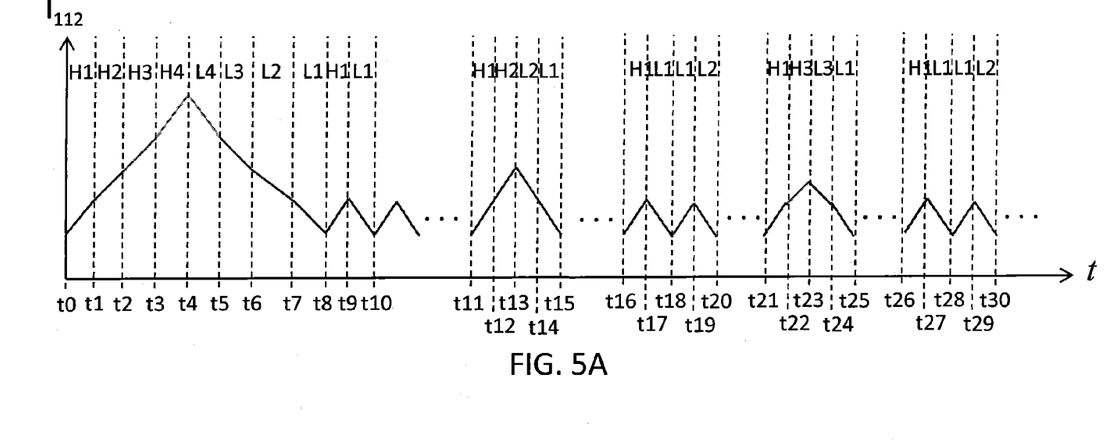
FIGS. 5A and 5B are examples of current versus time graphs of a piggyback control method of a DC to DC converter in accordance with FIGS. 1 and 2.
Figure 5B:
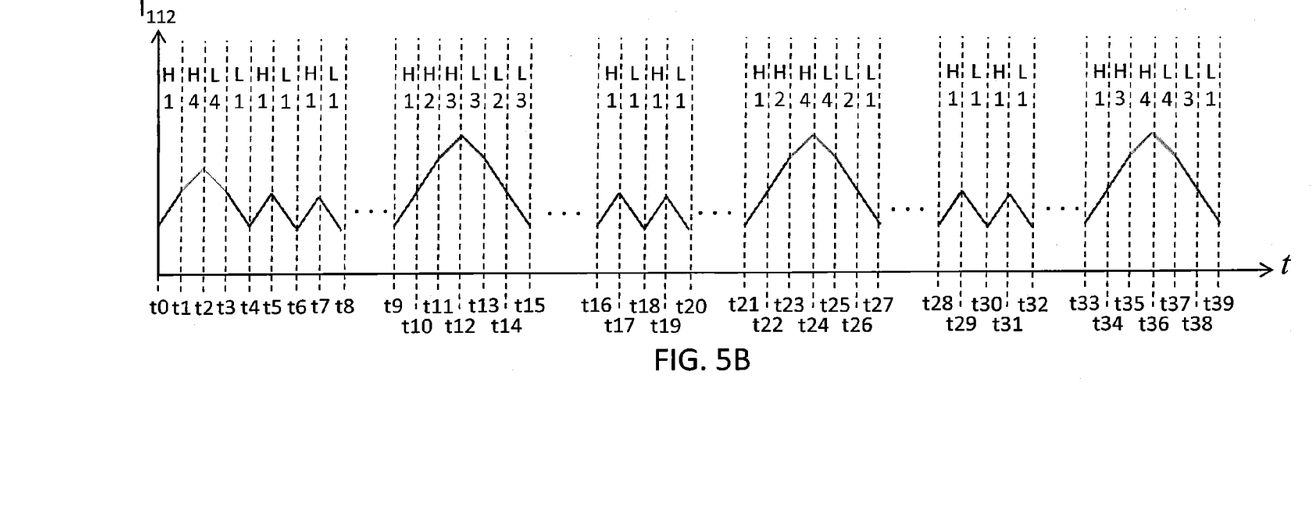

FIGS. 5A and 5B are current versus time diagrams of a SIMO DC to DC converter in accordance with FIG. 2 in which inductor 112 is coupled to four output nodes OUT-1, OUT-2, OUT-3, and OUT-4. In particular, FIG. 5A illustrates a current versus time diagram when one of the loads, e.g., the load coupled to output node OUT-1, is a large load and the other three loads are smaller loads, i.e., the loads coupled to output nodes OUT-2, OUT-3, and OUT-4.

In FIG. 5A, the current through inductor 112, $I_{112}$, increases from times t0 to t4 as controller 104 enters states H1, H2, H3, and H4 in which controller 104 outputs control signals that selectively couple inductor 112 to VDD and to each of the output nodes OUT-1, OUT-2, OUT-3, and OUT-4. For example, control signal CTRL-H turns on transistor 106 and control signal CTRL-1 closes switch 116-1 in state H1 such that inductor 112 is charged by the high power supply and a current through inductor 112 is provided to output node OUT-1.

In state H2 between times t1 and t2 controller 104 asserts control signals CTRL-H and CTRL-2 to continue to charge inductor 112 and to drive the load coupled to output node OUT-2. Controller 104 asserts control signals CTRL-H and CTRL-3 in state H3 (times t2 to t3) to continue to charge inductor 112 and to drive the load coupled to output node OUT-3 and asserts control signals CTRL-H and CTRL-4 in the state H4 (times t3 and t4) to further charge inductor 112 and to drive the load coupled to output node OUT-4.

Between times t4 and t8 controller 104 cycles through states L4, L3, L2, and L1 to discharge the energy stored in inductor 112. For example, controller 104 asserts control signals CTRL-L and CTRL-4 (L4 state) between times t4 and t5 to couple inductor 112 to the low power supply node, i.e., ground. In the L4 state, current discharges from inductor 112 to drive the load coupled to output node OUT-4. Controller 104 asserts control signals CTRL-L and CTRL-3 in the state L3, control signals CTRL-L and CTRL-2 in the state L2, and CTRL-L and CTRL-1 in the state L1.

Since the load coupled to output node OUT-1 is a larger load, it is provided with more charging cycles than the loads coupled output nodes OUT-2, OUT-3, and OUT-4. For example, controller 104 transitions from the L1 state to the H1 state in which controller 104 asserts control signals CTRL-H and CTRL-1 to stop discharging inductor 112 and begin charging inductor 112 by coupling inductor 112 to the high voltage power supply through transistor 106. Inductor 112 begins discharging at time t9 in response to controller 104 being in an L1 state in which control signals CTRL-L and CTRL-1 are asserted. Controller 104 begins charging inductor 112, which is coupled to output node OUT-1, at time t10 as controller 104 is in the H1 state.

Controller 104 may continue to switch between states H1 and L1 to charge and discharge inductor 112 and provide current to the load coupled to output node OUT-1 until a later time at which point other loads need to be driven. For example, controller 104 enters the H1 state at time t11 and enters the H2 state at time t12. Once the loads coupled to output nodes OUT-1 and OUT-2 are coupled to inductor 112 when inductor 112 is coupled to the high voltage source. Inductor 112 discharges between times t13 and t15 when controller 104 is in states L2 and L1.

With the charging cycle of the load coupled to output node OUT-2 completed, controller 104 may transition back to the charging cycle for the load coupled to output node OUT-1. An example of a charging cycle for charging the load coupled to output node OUT-1 between times t16 and t20. In particular, controller 104 may be in the H1 state between times t16 and t17 in which control signals CTRL-H and CTRL-1 are asserted. Inductor 112 is discharged between times t17 and t18. The charging and discharging of inductor 112 when inductor 112 is coupled to the load coupled to output node OUT-1 is repeated between times t18 and t20 as shown in FIG. 5A.

At a later time, e.g., time t21, the load coupled to output node OUT-3 may be charged by inductor 112. The charging cycle between times t21 and t25 may begin with the charging of the load coupled to output node OUT-1 in response to controller 104 being in an H1 state in which control signals CTRL-H and CTRL-1 are asserted. At time t22, controller 104 is in a H3 state in which it asserts control signals CTRL-H and CTRL-3 to switching circuitry 102.

Inductor 112 is discharged between times t23 and t25 when controller 104 is in states L3 and L1 such that inductor 112 is coupled to the low voltage power supply and to sequentially coupled to output nodes OUT-3 and OUT-1. Controller 104 may once again repeat the charging cycles for charging the load coupled to output node OUT-1 as shown between times t26 and t30, which is identical to the charging cycle described above between times t16 and t20.

The piggyback control method described above with respect to FIG. 5A advantageously reduces the amount of current through inductor 112 by only providing power cycles to certain loads at certain times. Additionally, the piggyback control method also reduces switching loss by minimizing or reducing the amount of times the transistors are switching thereby increasing power efficiency of the SIMO DC to DC converter. When each load needs to be charged at approximately the same time, a charging cycle may be used in which each load is sequentially charged as illustrated between times t0 and t8.

The number of loads coupled to a SIMO DC to DC converter and the times at which the loads are charged may be adjusted as will be understood by one skilled in the art. For example, FIG. 5B illustrates another current versus time graph of a SIMO DC to DC converter configured to drive four loads in accordance with the piggyback control method.

As shown in FIG. 5B, the current through inductor 112, $I_{112}$, increases between t0 and t2 when controller 104 is in states H1 (between times t0 and t1) and H4 (between times t1 and t2). In state H1, inductor 112 is coupled to VDD through transistor 106 and to the load coupled to OUT-1 through transistor 116-1, and inductor 112 is coupled to VDD through transistor 106 and to the load coupled to node OUT-4 through transistor 116-4 when controller 104 is in state H4.

At time t2, controller 104 changes from the H4 state to an L4 state in which transistor 106 is turned off and transistor 108 is turned on while transistor 116-4 continues to couple the load coupled to output node OUT-4 to inductor 112. Between times t3 and t4 controller 104 is in an L1 state in which inductor 112 is coupled to ground through transistor 108 and to output node OUT-1 through transistor 116-1. Controller 104 may continue to switch between states H1 and L1 to charge and discharge inductor 112 and provide current to the load coupled to output node OUT-1 until a later time at which point other loads need to be driven.

For example, controller 104 enters the H1 state at time t9 and enters the H2 state at time t10. In the H2 state between times t10 and t11, controller 104 asserts control signals CTRL-H and CTRL-2 to couple inductor 112 to VDD through transistor 106 and to output node OUT-2 through transistor 116-2. Between times t11 and t12 controller 104 is in the H3 state in which inductor 112 is coupled to VDD through transistor 106 and to output node OUT-3 through transistor 116-3.

Inductor 112 is coupled to ground through transistor 108 and to output node OUT-3 through transistor 116-3 between times t12 and t13 in response to controller 104 being in an L3 state in which controller 104 asserts control signals CTRL-L and CTRL-3.

After time t15, controller 104 switches between states L1 and H1, as described above with respect to times t4 through t9, until time t21. At time 21, the load coupled to output node OUT-1 is charged in response to controller 104 being in an H1 state to couple inductor 112 to VDD through transistor 106 and to output node OUT-1 through transistor 116-1. The load coupled to output node OUT-2 is then charged in response to controller 104 being in the H2 state in which the load coupled to OUT-2 is coupled to inductor 112, which is also coupled to VDD through transistor 106, between times t22 and t23.

At time t23, controller 104 transitions from the H2 state to the H4 state to charge the load coupled to output node OUT-4. In the H4 state, controller 104 asserts control signals CTRL-H and CTRL-4 to respectively turn on transistors 106 and 116-4 such that inductor 112 is coupled to VDD and to output node OUT-4. Once the load coupled to output node OUT-4 has been charged, controller 104 continues to assert control signal CTRL-4, but switches from asserting control signal CTRL-H to asserting control signal CTRL-L at time t24 to couple inductor 112 (and the load coupled to OUT-4) to ground.

At time t25, controller 104 continues to assert control signal CTRL-L, but switches from asserting control signal CTRL-4 to asserting control signal CTRL-2 to maintain inductor 112 being coupled to ground and to couple the load coupled to node OUT-2 to inductor 112. Between times t26 and t33 controller 104 switches between states L1 and H1, as described above with respect to times t4 through t9. At time 33, inductor 112 is coupled to VDD through transistor 106 and to the load coupled to OUT-1 in response to controller 104 being in the H1 state.

The load coupled to output node OUT-3 is charged between times t34 and t35 as controller 104 asserts control signals CTRL-H and CTRL-3 to turn on transistors 106 and 116-3. At time t 35, the load coupled to output node OUT-4 begins to be charged in response to controller 104 switching from the H3 state to the H4 state in which control signals CTRL-H and CTRL-4 are asserted.

The current through inductor 112 is decreased between times t36 and t39 as controller 104 transitions to state L4 at time t36, to state L3 at time t37, and to state L1 at time 38. In state L4, control signals CTRL-L and CTRL-4 are asserted such that inductor 112 is coupled to ground through transistor 108 and to output node OUT-4 through transistor 116-4. Inductor 112 is coupled to ground through transistor 108 and to output node OUT-3 through transistor 116-3 in the L3 state. In the L1 state, controller 102 asserts control signals CTRL-L and CTRL-1 to couple inductor 112 to ground through transistor 108 and to the load coupled to output node OUT-1 through transistor 116-1.

In some embodiments, controller 104 uses a folded piggyback control method to minimize peak-to-peak current fluctuations through inductor 112 to reduce the average current through inductor 112 while maintaining the directional flow of current through inductor 112. The phrase "folded piggyback" is used to describe the operation of a SIMO DC to DC converter in which some loads are skipped during particular charging cycles and the waveform of the inductor is manipulated to produce a lower average current through the inductor.

Figure 6:
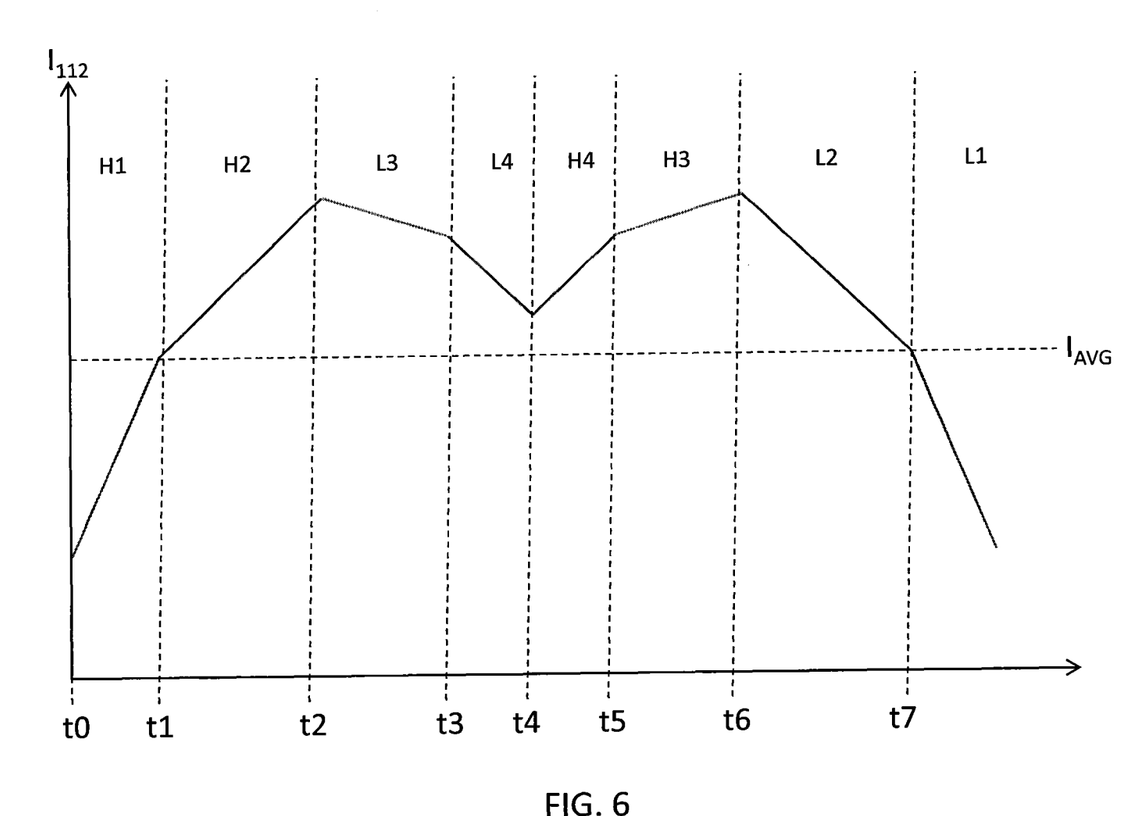
FIG. 6 is one example of a graph of current through an inductor versus time in accordance with the improved DC to DC converter illustrated in FIG. 1.

As shown in FIG. 6, transistor 106 is turned on in response to control signal CTRL-H from controller 104 such that the high supply voltage, VDD, is coupled to node 110 and transistor 108 is turned off in response to control signal CTRL-L such that node 110 is disconnected from ground. Control signal CTRL-1 is also asserted to turn on transistor 116-1 and control signals CTRL-2, CTRL-3, and CTRL-4 are not asserted to respectively turn off transistors 116-2, 116-3, and 116-4. With state machine 104 in an H1 state, i.e., control signals CTRL-H and CTRL-1 being asserted, transistors 106 and 116-1 are on and the other transistors of switching circuit 102 are off and the current through inductor 112 steadily increases towards a certain level.

At time t1, controller 104 is an H2 state in which control signals CTRL-H and CTRL-2 are asserted. In the H2 state, CTRL-H maintains transistor 106 in an on state and CTRL-L maintains transistor 108 in an off state. CTRL-1 opens switch 116-1, and CTRL-2 closes switch 116-2 such that OUT-2 is coupled to node 110 (and ultimately to VDD) through switch 116-2, inductor 112, and transistor 106. The current through inductor 112 continues to increase above $I_{AVG}$ between times t1 and t2.

At time t2, controller 104 is an L3 state in which it asserts control signals CTRL-L and CTRL-3 and does not assert other control signals. For example, control signal CTRL-L being asserted turns on transistor 108, and control signal CTRL-H not being asserted turns off transistor 106. With transistor 106 off and transistor 108 on, node 110 is disconnected from the first supply voltage and is coupled to the second supply voltage, e.g., ground, through transistor 108. CTRL-3 being asserted turns on switch 116-3 such that OUT-3 is coupled to node 114 and inductor 112 through switch 116-3. The remaining outputs, OUT-1, OUT-2, and OUT-4, are disconnected from node 114 by their respective switches 116-1, 116-2, and 116-4 in response to respective control signals CTRL-1, CTRL-2, and CTRL-4 that are not asserted. As shown in FIG. 6, the current through inductor 112 decreases as current flows from ground through transistor 108 to OUT-3.

The current through inductor 112 continues to decrease at time t3 when controller 104 enters an L4 state in which control signals CTRL-L and CTRL-4 are asserted. With control signal CTRL-L still asserted, current continues to flow from ground to inductor 112 as transistor 108 is on and transistor 106 is off (due to control signal CTRL-H not being asserted). Control signal CTRL-4 being asserted turns on switch 116-4 and the remaining switches 116-1, 116-2, 116-3 disconnect their respective outputs from inductor 112 as their respective control signals CTRL-1, CTRL-2, CTRL-3 are not asserted.

At time t4, control signal CTRL-4 continues to be asserted as controller 104 enters an H4 state. In the H4 state, the current through inductor 112 increases as transistor 106 is turned on in response to control signal CTRL-H such that the first supply voltage, e.g., VDD, is coupled to node 110 through transistor 106. The time at which controller 104 transitions from L4 state to the H4 state is selected to maintain the directional flow of current through inductor 112. To avoid the current through inductor 112 changing direction, for example, the current through inductor 112 is kept at a level that is greater than the level of the current at time t0, which may be used as a minimum current level.

At time t5, controller 104 enters an H3 state in which control signals CTRL-H and CTRL-3 are asserted and the remaining control signals are not asserted. In the H3 state, current through inductor 112 continues to increase as control signal CTRL-H keeps transistor 106 in the on state such that inductor 112 is coupled to the first power supply through transistor 106. The current through inductor 112 is provided to the load coupled to output OUT-3 and charges capacitor 118-3 as control signal CTRL-3 turns on switch 116-3 such that node 114 is coupled to node OUT-3.

The increase in current through inductor 112 continues until time t6 at which point controller 104 transitions from an H3 state to an L2 state. In the L2 state control signals CTRL-L and CTRL-2 are asserted such that transistor 108 is on and switch 116-2 is closed. Transistor 108 being on couples ground to node 110, and switch 116-2 being closed couples output node OUT-2 to node 114. Current flows from ground to inductor 112 such that the current through inductor 112 decreases as shown in FIG. 6 due to inductor 112 releasing stored energy.

At time t7, controller 104 enters an L1 state in which control signals CTRL-L and CTRL-1 are both asserted and the remaining control signals are not asserted. Control signal CTRL-L turns on transistor 108 such that inductor 112 is coupled to ground, and control signal CTRL-1 closes switch 116-1 such that output node OUT-1 is coupled to inductor 112. Current flows from ground to inductor 112 through transistor 108 thereby reducing the current through inductor 112. Although not shown in FIG. 6, one skilled in the art will understand that controller 104 may switch into the H1 or other state in which VDD is coupled to inductor 112 to maintain the direction current flow through inductor 112.

FIG. 6 is just one example illustrating a method controlling switching circuit 102 by controller 104 and one skilled in the art will understand that switching circuit 102 may be controlled in other manners. For example, switching circuit 102 may be controlled such that switches 116 are not turned on and off in sequential order as described above with respect to FIG. 6 (e.g., switch 116-1 followed by switch 116-2, etc.).

Figure 7:
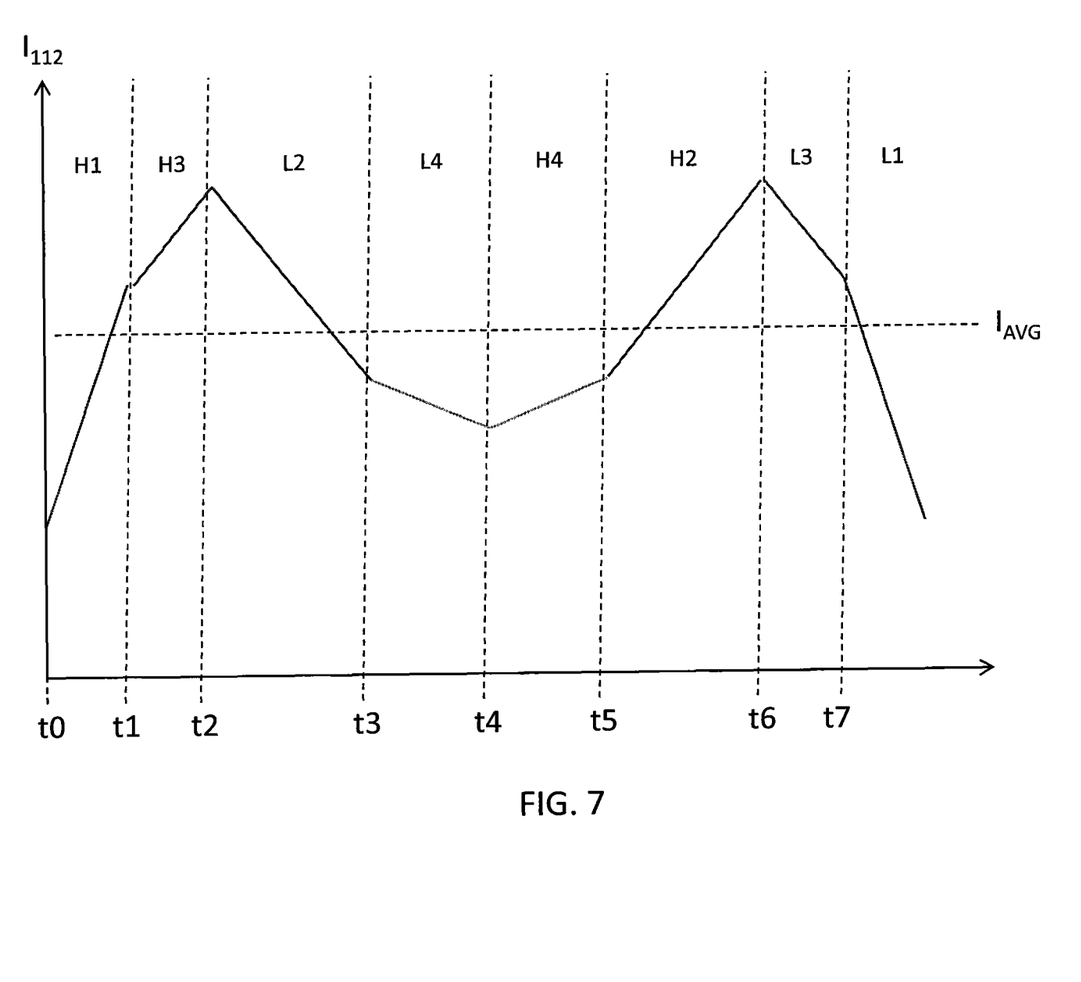
FIG. 7 is another example of a graph of current through an inductor versus time in accordance with the improved DC to DC converter illustrated in FIG. 1.

FIG. 7 illustrates another example of controlling the current through an inductor of switching circuit 102 by controller 104. As shown in FIG. 7, controller 104 transitions from state H1 between times t0 and t1 to state H3 between times t1 and t2 to increase the current through inductor 112. As described above, in the H1 state transistor controller 104 asserts control signals CTRL-H and CTRL-1 such that transistor 106 is on and switch 116-1 is closed. In the H3 state, control signals CTRL-H and CTRL-3 are asserted such that transistor 106 is on and switch 116-3 is closed.

Between times t2 and t3 controller 104 is in an L2 state is in an L4 state between t3 and t4. In the L2 state, transistor 108 is turned on and switch 116-2 is closed such that inductor is coupled to ground and to output node OUT-2. Transistor 108 stays on in the L4 state as CTRL-L control signal is still asserted to couple inductor 112 to ground, and switch 116-4 is closed to couple inductor 112 to output node OUT-4. The current through inductor 112 decreases when controller 104 is in the L2 and L4 states.

At time t4 the current through inductor 112 begins to increase as controller 104 is in an H4 state such that control signals CTRL-H and CTRL-4 are asserted. The time at which controller 104 transitions from L4 state to the H4 state is selected to maintain the directional flow of current through inductor 112. To avoid the current through inductor 112 changing direction, for example, the current through inductor 112 is kept at a level that is greater than the level of the current at time t0, which may be used as a minimum current level. With control signals CTRL-H and CTRL-4 asserted, inductor 112 is coupled to the first voltage source and switch 116-4 is closed such that current flows through inductor 112 to output node OUT-4.

The current through inductor 112 continues to increase from time t5 to t6 when controller 104 is in an H2 state in which inductor 112 is coupled to the high voltage supply through transistor 106 and to output node OUT-2 through switch 116-2. Transistor 106 is on in response to control signal CTRL-H being asserted, and switch 116-2 is closed in response to control signal CTRL-2 being asserted.

The current through inductor 112 reaches a peak at time t6 at which point controller 104 transitions to the L3 state in which control signals CTRL-L and CTRL-3 are both asserted. As described above, control signal CTRL-L being asserted turns on transistor 108 to coupled inductor 112 to ground, and control signal CTRL-3 being asserted closes switch 116-3 to couple output node OUT-3 to inductor 112. The coupling of inductor 112 to ground drains current from inductor 112 as shown in FIG. 7.

At time t7, control signals CTRL-L and CTRL-1 are asserted as controller 104 is in an L1 state to further reduce the current through inductor 112. In the L1 state, control signal CTRL-L turns on transistor 108 such that inductor 112 is coupled to ground, and control signal CTRL-1 closes switch 116-1 to couple output node OUT-1 to inductor 112.

The disclosed DC to DC converters advantageously combine form a folded piggyback control algorithm that enables reduced inductor average current and number of times the DC to DC converter switches while maintaining the direction flow of current through the inductor. Reducing the number of times the DC to DC converter switches provides for a higher power efficiency as switching loss is reduced.

In some embodiments, a DC to DC converter includes a switching circuit and a controller. The switching circuit includes an inductor coupled to first and second voltage supply nodes and to a plurality of output loads. The controller is configured to monitor a current through the inductor and to selectively couple the inductor to each of the plurality of output loads such that at least one of the following criteria is met: 1) an average current through the inductor is minimized for the particular output loads coupled to the switching circuit, or 2) minimize a number of times the switching circuit is switched during a charging period for the particular output loads coupled to the switching circuit.

In some embodiments, a method includes monitoring a plurality of output loads coupled to a switching circuit including a single inductor, comparing the monitored output loads to target values, and selectively coupling the single inductor to each of the plurality of output loads based on the comparison to minimize an average current through the single inductor for the particular output loads coupled to the switching circuit or to minimize a number of times the switching circuit is switched during a charging period for the particular output loads coupled to the switching circuit.

In some embodiments, a DC to DC converter includes a switching circuit and a controller. The switching circuit includes a single inductor coupled to a first node and to a second node, a first transistor having a source coupled to a first power supply node and a drain coupled to the first node, a second transistor having a source coupled to a second power supply node and a drain coupled to the first node, and at least third and fourth transistors coupled to the second node and to respective output nodes. The controller is coupled to each gate of each of the first, second, third, and fourth transistors. The controller is configured to monitor a current through the single inductor and to selectively couple the single inductor to one of the first and second power supply nodes and to one of the output nodes such that at least one of the following criteria is met: 1) an average current through the inductor is minimized for the particular output loads coupled to the switching circuit, or 2) minimize a number of times the switching circuit is switched during a charging period for the particular output loads coupled to the switching circuit.

Some or all of the disclosed systems and methods may be embodied in the form of methods and apparatus for practicing those methods. The present invention can also be embodied in the form of program code embodied in tangible media, such as CD-ROMs, DVD-ROMs, Blu-ray disks, hard drives, or any other machine-readable storage medium, wherein, when the program code is loaded into and executed by a machine, such as a computer, the machine becomes an apparatus for practicing the methods. The disclosed methods can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the methods. When implemented on a general-purpose processor, the program code segments combine with the processor to provide a unique device that operates analogously to specific logic circuits.

Although the disclosed systems and methods have been described in terms of exemplary embodiments, they are not limited thereto. Rather, the disclosed systems and methods should be construed broadly, to include other variants and embodiments, which may be made by those skilled in the art without departing from the scope and range of equivalents of the systems and methods.

What is claimed is:

1. A DC to DC convertor, comprising:
    a switching circuit comprising
        a first transistor having a source coupled to a first voltage supply node, a drain coupled to a first node, and a gate configured to receive a first control signal,
        a second transistor including a source coupled to a second voltage supply node, a drain coupled to the first node, and a gate configured to receive a second control signal,
        an inductor having a first terminal coupled to the first and second transistors at the first node and a second terminal coupled to a plurality of output loads at a second node, the second node being coupled to each of the plurality of output loads through a respective switch, the second node being different from the first node; and
    a controller configured to
        monitor the plurality of output loads,
        for each of the output loads, estimate a current level to flow through the inductor based on the monitoring,
        output the first control signal to the gate of the first transistor to selectively couple the first node to the first voltage supply node,
        output the second control signal to the gate of the second transistor to selectively couple the first node to the second voltage supply node, and
        selectively couple the inductor to one or more output loads by using the estimated current levels and asserting one or more switches corresponding to the one or more output loads with the first node being concurrently coupled to either the first voltage supply node or the second voltage supply node to minimize a number of times the switching circuit is switched during a charging period for charging the one or more output loads coupled to the switching circuit,
    wherein the controller is configured to skip one or more output loads during the charging period when sufficient stored energy is available to drive the one or more output loads.

2. The DC to DC converter of claim 1, wherein the first voltage supply node is set at a voltage that is greater than a voltage of the second voltage supply node.

3. The DC to DC converter of claim 1, wherein the controller includes a state machine comprising a processor and a computer readable storage medium.

4. The DC to DC converter of claim 1, wherein each of the respective switch is a transistor that has a gate configured to receive a respective control signal from the controller to turn assert the transistor.

5. The DC to DC converter of claim 1, wherein the switching circuit includes a plurality of capacitors, each of the plurality of capacitors disposed in parallel between a respective output node and a respective transistor through which the output nodes are coupled to the inductor.

6. The DC to DC convertor of claim 5, wherein each of the capacitors is coupled in parallel with a respective current source.

7. A method, comprising:
    monitoring a plurality of output loads coupled to a switching circuit including a single inductor;
    comparing the monitored output loads to target values;
    for each of the output loads, estimating a current level to flow through the single inductor based on the comparison; and
    selectively coupling the single inductor to each of output loads by using the estimated current levels and asserting one or more switches corresponding to the one or more output loads, respectively, with concurrently coupling the inductor to either a first voltage supply node or a second voltage supply node based on the comparison to minimize a number of times the switching circuit is switched during a charging period for charging the one or more output loads coupled to the switching circuit, and wherein one or more of the output loads is skipped during the charging period when sufficient stored energy is available to drive the one or more output loads to minimize the number of times the switching circuit is switched during the charging period.

8. The method of claim 7, wherein selectively coupling the single inductor to each of the output loads includes asserting control signals to gates of transistors of the switching circuit.

9. The method of claim 7, further comprising selectively coupling the single inductor to one of a first power supply node or a second power supply node.

10. The method of claim 9, wherein selectively coupling the single inductor one of the first power supply node or the second power supply node includes asserting control signals to a gate of one of a first transistor or a gate of a second transistor of the switching circuit.

11. The method of claim 10, wherein the first transistor has a source coupled to the first voltage supply node and a drain coupled to a first node that is coupled to the single inductor.

12. The method of claim 11, wherein the second transistor has a source coupled to the second voltage supply node and a drain coupled to the first node.

13. A DC to DC convertor, comprising:
a switching circuit including
  a single inductor having a first terminal coupled to a first node and a second terminal coupled to a second node that is different from the first node,
  a first transistor having a source coupled to a first power supply node and a drain coupled to the first node,
  a second transistor having a source coupled to a second power supply node and a drain coupled to the first node, and
  at least a third transistor and a fourth transistor that are coupled together and to the inductor at the second node, the third transistor and the fourth transistors also are coupled to respective output nodes; and
a controller coupled to each gate of the first, second, third, and fourth transistors, the controller configured to monitor the output nodes, to estimate a current level to flow through the single inductor for each of the output loads, and to selectively couple the first terminal of the single inductor to at least one of the first and second power supply nodes and to concurrently couple the second terminal of the single inductor to at least one of the output nodes by using the estimated current levels and asserting at least one of the third and fourth transistors to minimize a number of times the switching circuit is switched during a charging period for charging at least one of output loads coupled to the switching circuit, wherein the controller is configured to skip one or more output loads during the charging period when sufficient stored energy is available to drive the one or more output loads.

14. The DC to DC converter of claim 13, wherein the controller includes a state machine comprising a processor and a computer readable storage medium.

15. The DC to DC converter of claim 13, wherein the controller includes control logic.

16. The DC to DC converter of claim 13, wherein the switching circuit includes a plurality of capacitors, each of the plurality of capacitors disposed in parallel between a respective output node and a respective transistor through which the output nodes are coupled to the inductor.

17. The DC to DC convertor of claim 16, wherein each of the capacitors is coupled in parallel with a respective current source.

18. The DC to DC converter of claim 13, wherein the first voltage supply node is set at a voltage that is greater than a voltage of the second voltage supply node.

19. The DC to DC converter of claim 18, wherein the switching circuit includes a plurality of transistors coupled to the second node and to respective output nodes.

* * * * *